United States Patent
Plamthottam

(10) Patent No.: US 11,046,846 B2
(45) Date of Patent: Jun. 29, 2021

(54) DIP FORMABLE SOLUTIONS AND DISPERSIONS AND ARTICLES MADE THEREFROM

(71) Applicant: Sebastian S. Plamthottam, Upland, CA (US)

(72) Inventor: Sebastian S. Plamthottam, Upland, CA (US)

(*) Notice: Subject to any disclaimer, the term of this patent is extended or adjusted under 35 U.S.C. 154(b) by 0 days.

(21) Appl. No.: 16/605,232

(22) PCT Filed: Apr. 12, 2018

(86) PCT No.: PCT/US2018/027260
§ 371 (c)(1),
(2) Date: Oct. 15, 2019

(87) PCT Pub. No.: WO2018/194904
PCT Pub. Date: Oct. 25, 2018

(65) Prior Publication Data
US 2020/0123374 A1   Apr. 23, 2020

Related U.S. Application Data

(60) Provisional application No. 62/485,992, filed on Apr. 16, 2017.

(51) Int. Cl.
| | |
|---|---|
| C08L 53/00 | (2006.01) |
| C08L 25/08 | (2006.01) |
| C08L 23/06 | (2006.01) |
| C08J 5/18 | (2006.01) |
| B29C 41/00 | (2006.01) |
| B29C 41/14 | (2006.01) |
| B29C 41/22 | (2006.01) |
| B32B 25/08 | (2006.01) |
| B32B 25/14 | (2006.01) |
| C08L 91/00 | (2006.01) |
| B29K 25/00 | (2006.01) |

(52) U.S. Cl.
CPC ............ *C08L 53/00* (2013.01); *B29C 41/003* (2013.01); *B29C 41/14* (2013.01); *B29C 41/22* (2013.01); *B32B 25/08* (2013.01); *B32B 25/14* (2013.01); *C08J 5/18* (2013.01); *C08L 23/06* (2013.01); *C08L 91/00* (2013.01); B29K 2025/08 (2013.01); B32B 2250/248 (2013.01); C08J 2323/06 (2013.01); C08J 2353/00 (2013.01); C08J 2391/00 (2013.01); C08J 2453/00 (2013.01); C08J 2491/00 (2013.01); C08L 2201/56 (2013.01); C08L 2203/16 (2013.01); C08L 2205/025 (2013.01); C08L 2205/035 (2013.01); C08L 2207/066 (2013.01); C08L 2207/322 (2013.01)

(58) Field of Classification Search
CPC .......... B29C 41/14; C08L 53/00; C08L 25/08; C08L 2666/68; C08J 5/18
See application file for complete search history.

(56) References Cited

U.S. PATENT DOCUMENTS

| | | | |
|---|---|---|---|
| 5,112,900 A | 5/1992 | Buddenhagen et al. | |
| 5,204,390 A | 4/1993 | Szymanaki et al. | |
| 5,407,715 A * | 4/1995 | Buddenhagen | C08L 53/02 428/339 |
| 6,121,366 A * | 9/2000 | Sharma | A61L 29/049 524/487 |
| 6,503,569 B2 * | 1/2003 | Sneddon | C08J 3/092 427/385.5 |
| 6,838,537 B2 * | 1/2005 | Cordova | B05D 7/02 526/329.2 |
| 2002/0068782 A1 | 6/2002 | Sneddon | |
| 2003/0119972 A1 * | 6/2003 | Plamthottam | C08J 5/18 524/536 |
| 2003/0166776 A1 | 9/2003 | Wright et al. | |
| 2005/0184619 A1 | 8/2005 | Chen | |
| 2010/0063008 A1 | 3/2010 | Matteliano et al. | |
| 2014/0150947 A1 | 6/2014 | Shannon et al. | |

FOREIGN PATENT DOCUMENTS

| | | |
|---|---|---|
| WO | 199806774 | 2/1998 |
| WO | 2002064677 | 8/2002 |

OTHER PUBLICATIONS

Kraton G Polymers: https://kraton.com/products/KRATON_G.php (Year: 2020).*
International Search Report and Written Opinion dated Jun. 22, 2018; International Patent Application No. PCT/US2018/027260 filed Apr. 12, 2018. ISA/US.

* cited by examiner

*Primary Examiner* — Vu A Nguyen
(74) *Attorney, Agent, or Firm* — McDonald Hopkins LLC

(57) ABSTRACT

This invention relates to eco-friendly dip formable solutions and dispersions for making dip formed articles. Some embodiments of the invention include coatable, dip formable, or emulsifiable solution composition comprising one or more styrenic block copolymers in cyclic natural terpenes, such as citrus peel extract which can be used to form an article. In some embodiments dip formable solutions and dispersions comprise of styrenated block copolymers and polyolefins. In some embodiments the styrenated block copolymers are saturated, unsaturated, or a blend. In some embodiments, the styrenated block copolymers comprises an oil or a plasticizer. In some embodiments the articles are made from an emulsion. In some embodiments the articles are made from a plastisol.

12 Claims, No Drawings

DIP FORMABLE SOLUTIONS AND DISPERSIONS AND ARTICLES MADE THEREFROM

CROSS-REFERENCE TO RELATED APPLICATIONS

The present application claims priority to and the benefit of International Application No. PCT/US2018/027260 filed on Apr. 12, 2018, which claims priority to and the benefit of U.S. Provisional Application 62/485,992, titled "Dip Formable Solutions and Dispersions and Articles Made Therefrom," filed on Apr. 16, 2017, the entire disclosure of each of which is incorporated herein by reference.

FIELD

The present application relates to compositions suitable for use in producing dip formed articles. In particular, the present application relates to a composition comprising one or more styrenic block copolymers and a cyclic terpene. In embodiments, the composition also includes a polyolefin. The present application also relates to articles formed from the composition, and methods of forming such articles.

BACKGROUND

Articles such as surgical gloves, examination gloves, household gloves, cleanroom gloves, isolator box gloves, industrial gloves, electrical gloves, male and female condoms, catheters (balloon dilatation catheters, cervical ripening balloons, stent implantation balloons, retrieval balloon catheters), dental dams, finger cots, teats, pacifiers, soothers, swim caps, balloons, football bladders and the like are all normally made by a dip forming process from solutions or dispersions of natural or synthetic polymers. A form of the appropriate shape is dipped into the solution or dispersion of the compounded emulsion or solution, once or multiple times, to build a layer of desired thickness. Forms are normally rotated or moved in a specific controlled manner to obtain the desired distribution of material around the former without forming any pin holes or defects. The water or solvent is then allowed to evaporate, and in some cases the film after drying is cured to obtain a solid elastomeric film with adequate mechanical properties.

While compounded natural rubber latex is widely used to make surgical gloves, examination gloves, condoms, catheters etc., it has many drawbacks such as, for example, the presence of Type I and Type IV allergens, poor aging, low tactile sensitivity, and sometimes disagreeable odor. To address the Type I allergen issue, compounded neoprene, nitrile, and polyisoprene synthetic emulsions are widely used to make surgical and examination gloves. However, these materials also contain Type IV allergens and normally exhibit very low tactile sensitivity and induce fatigue during continuous use.

To improve the tactile sensitivity and to eliminate the Type I and Type IV allergens, saturated styrenic block copolymers were used instead of the compounded natural and synthetic emulsions as detailed in U.S. Pat. Nos. 5,112,900, 5,407,715 and 6,639,007. Such products were sold under the trade name Tactylon in the 1980's and 1990's. These patents used solutions of saturated styrenic block copolymers and oil in toluene type solvents to form a liquid solution to produce the dipped article such as a glove or condom. This process limits the type of compositions that can be used to improve the strength properties and tactile sensitivity of the product, since the components used need to dissolve in toluene to make a liquid solution for dipping. Some of these compositions are inherently tacky, and secondary chlorination type processes or powders were required to produce an easily donnable surgical or examination glove or certain lubricants were required for condoms.

There is a need to produce new compositions of dip formable solutions with improved properties and tactile sensitivity, and lower defect rate (pin holes). There is also a need to improve the manufacturing process since solution dipping process create excessive bubbles and defects due to the bubble retention ability of conventional solutions of styrenic block copolymers. In addition, complex movements, multiple dippings, and rotation of the formers are needed to obtain uniform and controlled thickness in the product.

SUMMARY

This invention relates to eco-friendly, dip formable solutions and dispersions for making dip formed articles. Some embodiments of the invention include coatable, dip formable, or emulsifiable solution composition comprising one or more styrenic block copolymers in a cyclic terpene based solvent (e.g., a citrus peel extract, such as d-limonene), which can be used to form an article. In some embodiments dip formable solutions and dispersions comprise of styrenated block copolymers and polyolefins.

The present invention provides a dip forming solution that provides a solution to one or more of the issues with conventional solutions. In one aspect, the present invention provides a dip forming solution of styrenic block copolymer compositions in eco-friendly cyclic terpenes. These can include terpenes such as those from citrus peel extract or citrus oil, d-limonene (CAS number 5989-27-5), 1-limonene or racemic dl-limonene. D-limonene is widely used as a safe natural flavor and fragrance additive in perfumes, soaps, food, chewing gum and beverages. However, cyclic terpenes, such as d-limonene, have not been used in dip forming solutions. Surprisingly, it was discovered that these cyclic terpenes can be used to form a thermoplastic gel with certain styrenic block copolymer compositions containing polyolefin polymers. These compositions surprisingly maintain a gel state at ambient temperatures and a dip formable liquid solution at elevated temperatures such as above 85° C. This allows the dip coating to retain the shape during the dipping process without resorting to complex movement and rotation of the former. Surprisingly, it was discovered that in addition to the above benefits these solutions retain no bubbles in the solution thus significantly improving the quality and properties of the film.

In one aspect, provided is dip formable composition comprising a styrenic block copolymer disposed in a cyclic terpene.

In one embodiment, the styrenic block copolymer is chosen from a saturated styrenic block copolymer or a mixture of saturated styrenic block copolymers.

In one embodiment of the dip formable composition of any previous embodiment, the composition further comprises an oil or plasticizer.

In one embodiment of the dip formable composition of any previous embodiment, the composition further comprises a polyolefin.

In one embodiment of the dip formable composition of any previous embodiment, the styrenic block copolymer is saturated.

In one embodiment of the dip formable composition of any previous embodiment, the composition comprises an oil or plasticizer.

In one embodiment of the dip formable composition of any previous embodiment, the block copolymer is a styrene-ethylene-butylene-styrene block copolymer.

In one embodiment of the dip formable composition of any previous embodiment, the styrenic block copolymer is present in an amount of from about 5% to about 50% by weight, the polyolefin in an amount of from about 0.1% to about 25% by weight, and the oil in an amount of from about 25% to about 75% by weight, where the % by weight refers to the % by weight of a dry film formed from the dip formable composition.

In one embodiment, the dip formable composition of any previous embodiment comprises any combination of:
from 5 weight % to about 50 weight %; or from about 5 weight % to about 25 weight % of the styrenic block copolymer;
cycloterpene in an amount of from about 0.1% to about 25%; or from about 1 weight % to 15 weight %; and
an oil in an amount of from about 20 weight % to about 75 weight %, or from about 30 weight % to about 50 weight %.

In one embodiment the dip formable composition of any previous embodiment is provided to yield a film having any combination of the following:
25 weight % to 75 weight %, 30 weight % to 60 weight %, or 40 weight % to 50 weight % of SBC,
25 weight % to 75 weight percent, 30 weight % to 60 weight %, or 40 weight % to 50 weight % of oil; and
0 to 25 weight %, 0.1 weight % to 25 weight %, 0.5 weight % to 20 weight %, or 1 weight % to 15 weight percent of polyolefin based on the dry weight of a film formed from the dip formable composition.

In one embodiment the styrenic block copolymer can be selected from the group SBS or SIS. If extenders are used, it is compatible with the mid-block polybutadiene or polyisoprene.

In one embodiment the styrenic block copolymer can be saturated such as SEBS or SEPS.

In one embodiment the saturated styrenic block copolymer contain a mid-block compatible oil in addition to cyclic terpenes.

In one embodiment the dip forming solution is made from a thermoplastic gel comprising styrenic block copolymer, polyolefin, and a cyclic terpene or mixture of cyclic terpenes.

In one embodiment the dip forming solution is made from a thermoplastic gel formed from components comprising saturated SBC's, oil and polyolefin.

In one embodiment the dip forming solution is made from a thermoplastic gel comprising SEBS, oil, and polyolefin.

In one embodiment of the dip formable composition of any previous embodiment, the composition is in the form of a solution, an emulsion, or a plastisol.

In another aspect, provided is a method for preparation of a film article comprising: (i) dipping a form in the shape of an article into a first dip formable composition of any previous embodiment; (ii) withdrawing the form from the solution; (iii) evaporating the cyclic terpenes from the film on the form; and (iv) removing the formed article from the form.

In one embodiment, evaporating the cyclic terpenes from the film on the form comprises evaporating substantially all the cyclic terpenes from the film.

In one embodiment of the method of any previous embodiment, prior to the step of dipping a form in the shape of article into the dip forming composition, the method comprises heating the dip formable composition above the ambient temperature but below the boiling point of the cyclic terpene to form a dip formable solution.

In on embodiment of the method of any previous embodiment, the method is employed to form a multilayered article and comprises repeating steps (i)-(iii) with a second dip formable composition for forming an elastomeric material.

In one embodiment, the second dip formable composition is a dip formable composition of any previous embodiment, and is different from the first dip formable composition.

In another aspect, provided is an article formed from the dip formable composition of any previous embodiment.

In one embodiment, the article is a multilayered article.

In one embodiment of an article of any previous embodiment, the article is chosen from a glove, a condom, a catheter, a dental dam, a finger cot, a teat, a pacifier, a soother, a swim cap, a balloon, or a bladder for a ball.

In still a further aspect, provided is an article formed from the method of any previous embodiment.

In one embodiment, the article is chosen from a glove, a condom, a catheter, a dental dam, a finger cot, a teat, a pacifier, a soother, a swim cap, a balloon, or a bladder for a ball.

These and other aspects and embodiments may be further understood with reference to the following detailed description.

DETAILED DESCRIPTION

Reference will now be made to exemplary embodiments, examples of which are illustrated herein. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The term, "dip forming" or "dip coating" refers to the process in which thin-walled polymer products are produced. As used herein, the term "thin walled polymer products" refers to elastomeric articles (such as, but not limited to, gloves, condoms, balloons, catheter balloons, catheters, dental dams, finger cots, teats and the like) having a thickness in the range from about 0.001 mm (e.g. for products such as condoms) to about 5 millimeters for thicker articles.

Normally, the dip forming process involves first immersing a former in the shape of the desired article. Formers can be made from ceramic, glass, aluminum, and the like. The former is dipped into a solution or emulsion or a plastisol and subsequently slowly withdrawing the former from the solution or emulsion or plastisol. The formers can have a release coating if desired.

The term "solution" refers to a polymer dissolved in a suitable solvent that forms a homogeneous liquid solution so that a uniform thin coherent coating deposit forms on the former when immersed and withdrawn slowly in a controlled manner. Normally, with liquid solutions, the liquid runs off and drips from the former and the process may require complex movement of the former such as rotation, inversion, up and down or W type motions or combinations of these to produce a uniform coating without drip marks or defects. The solvent is then evaporated under controlled conditions above ambient to form a defect free product which is then peeled off from the former. In some cases, a release type coating or powder is applied to prevent sticking. The thickness of the deposit can be increased by multiple dips or by controlling the dipping parameters such as speed, temperature, viscosity of the solution etc.

The term "emulsion" refers to a particle suspension in water stabilized by an anionic, non-ionic, or cationic surfactant. The average particle size in this case is normally from about 0.2 microns to about below 5 microns, and the dispersion medium or continuous phase is water or water and surfactants. Emulsions could also be nano emulsions in which the average particle size will be from about 10 nanometers to about 100 nanometers. The solid content of the emulsion can be from about 10 weight % of the emulsion to about 75 weight % percent of the emulsion. For dip forming the solid content is normally from about 30 weight percent to about 55 weight percent depending on the process such as viscosity or the manufacturing method. For straight dip process, the solid content is about 50 weight percent.

The term "plastisol" refers to a particle suspension in oil, normally containing a non-ionic surfactant as a stabilizer, with an average particle size of the suspended particles below about 10 microns, preferably below about 2 microns. The amount of suspended particles can be from about 30 weight percent to about 70 weight percent. The plastisol should maintain stable viscosity during storage and handling.

As used herein, the term "styrenated block copolymer" (hereafter designated as "SBC") refers to a linear triblock (A-B-A type) or radial block or multi arm block copolymer (AB)n type where A is predominantly the hard, high glass transition temperature (Tg) polystyrene segment, and B is predominantly the low Tg rubbery or elastomeric segment. A is normally known as the end blocks and B as the mid blocks. If the elastomeric segment is polybutadiene, the SBC linear triblock is named poly(styrene-b-butadiene-b-styrene) or SBS for short, and if the elastomeric mid-block is polyisoprene, then this SBC linear triblock is named poly (styrene-b-isoprene-b-styrene) or SIS for short. The mid-block is unsaturated in SBS or SIS. The elastomeric midblock can be saturated as in poly(styrene-b-ethylene/butylene-b-styrene) hereafter designated SEBS, poly (styrene-ethylene/propylene-styrene), hereafter designated SEPS, poly(styrene-b-ethylene/ethylene-b-styrene), hereafter designated SEES. These are also known as saturated SBC's or hydrogenated SBC's. SBC's as used herein include functionalized mid or end blocks. SBC's differ in molecular weight, end block content, diblock content, saturation, functionality etc. Various grades are available under the trade name Kraton from Kraton Polymers, and Septon and Hybrar from Kuraray. In making soft elastomeric articles such as gloves, condoms, and balloons, the phase volume of the hard segment in the final article composition is typically below about 20% by volume. The SBC's can have end block or hard segment phase volume greater than 20%, but the end block content can be reduced to below 20% (by volume) by adding oils or polyolefin or polyolefin and oils, or other mid-block compatible extenders. The block copolymers may be partially tapered or untapered. The term "tapered" means that the B block changes gradually from rubbery rich homopolymer sequence to include increasing amounts of hard A block segments in a gradual conversion at the junction to hard A homopolymer end block. The block copolymers can be a radial or star block copolymer.

As used herein, the term "cyclic terpene" refers to a compound having an isoprene group and a saturated or unsaturated six-member carbon ring. Examples of suitable cyclic terpenes include, but are not limited to, d-limonene, l-limonene, racemic dl-limonene, limonene, dipentene, pinene, alpha-pinene, beta-pinene, mixtures of alpha- and beta-pinene, carene, delta-3-carene, etc. The cyclic terpene may be either a naturally sourced or synthetically produced material. In embodiments, the cyclic terpene may be naturally sourced such as from citrus peels (e.g., from oranges, lemons, etc.).

"Polyolefin" refers to a polymer produced from an olefin monomer. Examples of suitable polyolefins include, but are not limited to, polyethylene, polypropylene, ethylene copolymers, propylene copolymers, butylene copolymers, and hexene copolymers. More specific examples include, but are not limited to, linear low density polyethylene (LLDPE) (0.915-0.925 g/cubic centimeter), ultra high molecular weight polyethylene, low density polyethylene (0.910-0.940 g/cubic centimeter), high density polyethylene (>0.941 g/cubic centimeter), polypropylene, polypropylene/ethylene copolymers and the like. The copolymers can be partially or highly crystalline and include without limitation polyolefins made using metallocene catalysts. Blends of two or more polyolefins may be used. Many such polyolefins are supplied by Dow and Exxon/Mobil Chemical Companies. The polyolefin should form a liquid solution in a cyclic terpene at above ambient temperature, preferably above about 70° C. and preferably below the boiling point of the cyclic terpene. In dip forming from solutions, it is desirable that the liquid solution of the SBC compositions with polyolefin form a thermoplastic gel at or below ambient temperature. "Ambient temperature" refers to room temperature, or from about 10° C. to about 40° C. The polyolefin can also mean a microcrystalline, semicrystalline, or amorphous wax or a blend of waxes. Such compositions surprisingly produce a smooth film with unique properties.

"Thermoplastic gel" as used herein refers to a solution comprising SBC's and polyolefin, optionally with extenders such as oil, in a cyclic terpene and which forms a homogenous liquid solution at elevated temperature and a gel at near ambient and lower temperatures. "Gel" refers to a "gello pudding" like texture and flow characteristics at near or below ambient temperatures. "Thermoplastic" refers to flow characteristics more like a liquid or polymer solution at elevated temperature, the viscosity and temperature at which it starts flowing depending on the composition of the blend.

In one embodiment dip formed articles are made from styrenic block copolymers (SBC's) dissolved in a cyclic terpene. Optionally, mid-block compatible extenders such as hydrocarbon oils (aromatic, napthenic, or paraffinic), silicone oils, silicone polymers, waxes, and the like can be used in these compositions. These materials are referred to herein as "oils". The oil is chosen so that it is compatible with the rubbery mid-block and preferably not compatible with the polystyrene end-blocks.

In one embodiment the SBC's can be selected from the group SBS or SIS. If extenders are used, it is compatible with the mid-block polybutadiene or polyisoprene.

In one embodiment the SBC's can be saturated such as SEBS or SEPS.

In one embodiment the saturated SBC's contain a mid-block compatible oil in addition to cyclic terpenes.

In one embodiment the dip forming solution is made from a thermoplastic gel comprising SBC's, polyolefin and a cyclic terpene or mixture of cyclic terpenes.

In one embodiment the dip forming solution is made from a thermoplastic gel formed from components comprising saturated SBC's, oil and polyolefin.

In one embodiment the dip forming solution is made from a thermoplastic gel comprising SEBS, oil, and polyolefin.

The SBC's surprisingly dissolve readily in cyclic terpenes by agitation at ambient temperature, the extenders such as oil can be added into this solution if desired and mixed thoroughly. The polyolefin can be initially soaked or agitated and then heated to about 70 to 110° C. to form a solution in cyclic terpene. It forms a polyolefin thermoplastic gel when cooled. This can be added if desired to the SBC solution in cyclic terpene and heated and homogenously mixed. The polyolefin can also be blended with the SBC's and then dissolved in cyclic terpene by heating. Surprisingly, the SBC's and polyolefin in cycloterpene such as, for example, d-limonene or citrus oil, forms a dip formable solution at elevated temperature at about 90° C. and a thermoplastic gel at ambient temperature. Only a very low concentration of polyolefin is needed to convert an SBC solution in cyclic terpene to a thermoplastic gel at ambient temperature. The SBC content in the solution can be from 5 weight % to about 50 weight % depending on the temperature, and in embodiment, from about 5 weight % to about 25 weight % for dip forming solutions. The polyolefin can be provided into a solution in hot cycloterpene in an amount of from about 0.1% to about 25%, and in embodiment from about 1 weight % to 15 weight % depending on the grade and type of polyolefin. In one embodiment, the composition comprises an oil in an amount of from about 20 weight % to about 75 weight %, or in an embodiment from about 30 weight % to about 50 weight %. The materials can be adjusted and selected as desired to control the properties of the elastomeric material formed therefrom. Increasing the olefin content can provide a material with a more "vinyl-like" feel and is suitable where the compositions are to be used in applications where vinyl materials are currently used. For applications where greater flexibility is required, the composition employs higher levels of oil, which provide softer or low modulus compositions. The solid content (SBC, polyolefin, oil) in the composition is controlled so that the solution in cyclic terpene forms a liquid solution at the dip forming temperature.

In embodiments, the dip formable composition is provided to yield a film having:
25 weight % to 75 weight %, 30 weight % to 60 weight %, or 40 weight % to 50 weight % of SBC,
25 weight % to 75 weight percent, 30 weight % to 60 weight %, or 40 weight % to 50 weight % of oil, and
0 to 25 weight %, 0.1 weight % to 25 weight %, 0.5 weight % to 20 weight %, or 1 weight % to 15 weight percent of polyolefin based on the dry weight of a film formed from the dip formable composition.

The composition may include other additives as desired for a particular purpose or intended application. Suitable additives include, but are not limited to, reinforcing fillers, colorants (e.g., pigments, dyes, etc.), brighteners, antioxidants, antiozonants, UV stabilizers, biocides, fragrances, flavoring, etc. Reinforcing fillers and inert diluent fillers may be employed in proportions up to about 25% by weight of the polymer. Such fillers, which may include carbon black, silica, and the like, as those of ordinary skill in the art will readily apprehend, can result in material improvement and enhancement of some of the physical properties of the thermoplastic polyurethane elastomers.

Pigments, dyes, lakes, opacifiers, optical brighteners, and the like may also be employed to provide a wide range of colors and other optical properties. Titanium dioxide, zinc oxide, and other particulate optical ingredients can be dispersed in the solution in suitable amounts. Soluble materials in the solvent system can be dissolved in suitable amounts. Such components can be present in the solution at levels of up to as much as about 5% by weight of polymer in the dip molding solution.

When required, radiopaque pigments, such as lead particles, lead oxide, barium sulfate, bismuth subcarbonate, bismuth trioxide, bismuth oxychloride, and the like can be formulated into the dip molded articles by inclusion in the dip molding solution. Such radiopaque pigments make the molded articles detectable by X-Ray, and in higher proportions provide at least partial shielding to protect the user of the article. Full protection and shielding from X-Ray exposure will generally require additional protective measures however, as the shielding afforded in the present invention will generally be only partial. Such ingredients can be an important aspect of medical and surgical gloves, and for implantable devices or surgical implements such as catheter balloons, for example.

Antioxidants and ultraviolet stabilizers are frequently desirable additions to the formulations, as such ingredients can serve to substantially extend the service and shelf life of dip molded rubber goods molded of thermoplastic polyurethane elastomers.

Suitable biocides, biostats, flavors, fragrances and deodorants for use in the thermoplastic polyurethane elastomers may also be included in minor amounts, typically up to about 2% by weight of the polymer.

The compositions may be employed in a dip forming process to form an article. The dipping solution is placed in a dipping tank, and preferably heated if the SBC composition contains a polyolefin (thermoplastic gel) to form a liquid. A former in the shape of the article is dipped slowly into this solution. The temperature of the former may be cool or warm. The formers are optionally rotated or inverted up and down to distribute the coating evenly on the surface of the former. The complex movements can be reduced or eliminated if the solution contains a polyolefin which forms a thermoplastic gel during removal of the former from the hot solution because of partial cooling and the formation of a thermoplastic gel. The gel solidifies and forms a coherent film on the former during evaporation of the cyclic terpene in an oven. Substantially all of the cyclic terpene is evaporated during the process. The cyclic terpene can be condensed, recovered, and purified for reuse for making solutions for a new batch for dipping. The cyclic terpene can also be steam stripped and recovered. After drying, the article can be peeled off from the former using technologies which are known in the art such as by hand, robotic stripping, air gun, mechanical roll down, water jet, and the like.

In another embodiment the dip forming is done using an emulsion of the SBC composition. Such emulsions are made from a solution of the SBC composition in cyclic terpene. To produce the emulsion, the SBC composition in the form of a near liquid solution in cyclic terpene, is dispersed in water containing suitable surfactants using high speed homogenizers such as rotor stator assemblies or high pressure homogenizers. Emulsifiers used can be anionic, cationic, or non-ionic. Examples of anionic surfactants include, but are not limited to, alkali metal salts of sulfosuccinic acid, dioctyl ester of sulfosuccinic acid, carboxylic acid salts of stearic acid, linoleic acid, lauric acid, oleic acid, alkali metal salts of disproportionated rosin, sodium dodecyl sulfonate (SDS), and the like. Non-ionic surfactants include polyvinyl alcohol, Triton X100 and the like. There are many methods of making emulsions but the specific means does not form an essential part of the invention. In the case of a thermoplastic gel, it should be generally heated to form a liquid before emulsification. The viscosity of the solution is such that an emulsion can be formed, and the viscosity can be reduced by heating if desired or heating under pressure if a higher solid content is desired. The solid content is normally from about 5% to about 75% in cyclic terpene solution, preferably from 5% to 35%. Emulsification can be done under pressure if higher solid content and higher temperatures are needed to reduce the viscosity to form a stable emulsion. Emulsification of the SBC composition can be accomplished at a wide range of concentrations, the optimum depends on the type of emulsification device being used. After emulsification, the cyclic terpene is substantially removed by flashing, heating, steam stripping, heating under reduced pressure, foaming followed by collapse or combinations of the above. Dip formable emulsions can be prepared by partially removing some of the cyclic terpene from the composition, substantially removing, or removing all of the cyclic terpene. As used herein, removing substantially removing the cyclic terpene refers to removing the cyclic terpene such that about 10 weight % or less of cyclic terpene is present, less than about 7.5 weight %, less than 5 weight %, less than 2.5 weight percent, even less than 1 weight % of cyclic terpene is present. Antifoaming agents can be added if desired. The emulsion can then be concentrated if desired by centrifugation, creaming, evaporation and the like. The preferred solid content is from about 30% by weight to about 75% by weight, the average particle size below about 5 microns and preferably below about 2 microns and the surfactant level from about 0.5 weight percent to about 10 weight percent of the emulsion, preferably from about 1% to about 5% and more preferably from 1 to 2 weight percent. The surfactant level depends on the particle size of the emulsion, smaller particle sizes require normally higher surfactant levels to keep the emulsion stable for dipping. For coagulant type dipping processing it is preferred that the surfactant is anionic and preferably alkali metal salt of disproportionated rosin.

In another embodiment the emulsion can be converted into a nano or micron size powder by known methods such as spray drying or freeze drying. It is preferred that mineral oils are not present in such compositions, and the compositions contain high levels of end block segments, and desired levels of polyolefin. These powders can also be made from a blend of SBC and polyolefin using cryogrinding or other known processes. These powders can also comprise other materials such as nonionic surfactants during its preparation, end block compatible resins and the like. The SBC blend composition can then be converted into a plastisol by dispersing in an oil such as mineral oil by known plastisol preparation process using suitable surfactants or surfactants added during the preparation of the powder. The powder levels can be from about 5% to about 75% by volume. Such compositions can be used to make dip formed articles.

The compositions and methods described herein are suitable for making films having a wide range of properties. It will be appreciated that the properties of the film will be determined by the amount of the components (e.g., SBC, oil, polyolefin) present in the composition. For example, the presence of polyolefin increases the tensile strength and also increases the tear resistance of the film. It will also be appreciated that the desired properties of the film will depend on the particular application. In some embodiments, e.g., it may be desirable to provide a relative thin film having high strength properties. In embodiments, the film has a tensile strength of at least about 12 MPa, at least about 17 MPa, even at least about 24 MPa. In embodiments, the film has an elongation at break of at least about 300%, at least about 500%, even at least about 900%. Here as elsewhere in the specification and claims, numerical values may be combined to form new and non-specified ranges.

The articles produced employing the compositions may be a single layer or multi-layered article. Multilayered articles can be formed by dipping a former in different compositions to form the respective layers. For example, it may be desirable to provide an article having an inner layer exhibiting a first property or characteristic and a second (or other additional layers) that provide other properties or characteristics to the article. In the case of a condom, for example, it may be desirable to provide an inner layer has relatively low lubricity to avoid slippage, while providing an outer layer that is more lubricious. This could be achieved, for example, by providing an inner layer with a lower level of polyolefin, and an outer layer with a higher level of polyolefin. In the case of gloves, it may be desirable to have an inner layer with a reduced friction relative to a wearer's skin, and an outer layer that may provide more tack or grip.

EXAMPLES

Aspects and embodiments of the technology are further understood in reference to the following examples. The following examples are for illustrating aspects and embodiments of the technology and are not intended to limit the scope of the invention:

Example 1

A solution of styrenic saturated block copolymer was prepared by dissolving 10.5 grams of Kraton g 1651, 15.5 grams of Kraton G 1650 and 15.5 grams of mineral oil (Drakeoil 34) in 190 grams of d-limonene. Another solution was prepared using 10 grams of a polyolefin copolymer in 90 grams of d-limonene at about 90 degree centigrade. Various compositions were prepared by blending the two solutions in appropriate ratios at above about 90 degree centigrade. These blend solutions form a thermoplastic gel at ambient temperature and a dip formable solution at elevated temperature. The viscosity of the dip forming solution can be controlled by controlling the solid content in the d-limonene solution. The d-limonene is substantially removed by evaporation and recovered after forming the film. The following dry film compositions were prepared using this approach.

Kraton G1651 (21.6 wt %), Kraton G 1650 (31.8 wt %), Mineral oil (31.8%), Polyolefin copolymer (14.8 wt %). A film of 0.04 mm thickness showed a tensile strength of 31 MPa and Elongation at break of 900%.

By varying the type of polyolefin and the level of polyolefin, a wide range of stress strain properties were achieved which were not achievable using the saturated thermoplastic elastomer and oil alone. These properties range from very soft, elastic high strength rubbery films to nontacky very high strength self-reinforcing films and plasticized vinyl type films with yielding characteristics and feel. Thus by selecting the styrenic copolymer, oil and the polyolefin a wide range of physical properties are achievable in dip formed films. Dip formable solutions can also be prepared using C-Flex type materials which were not possible in the past. The solutions can also be converted to waterborne emulsions or plastisols for dip forming processes.

Example 2

A dry film composition was prepared from Kraton G 1651 (22.5 weight %), Kraton G 1650 (33 weight %), Mineral oil (33 weight %), polyethylene (11.5 weight %) using d-limonene as solvent. The film showed a tensile strength of 27 MPa and Elongation at break of 1100%.

Example 3

A film with a plasticized vinyl type properties was obtained using Kraton G 1651 (13.6 weight %), Kraton G 1651 (16.2 weight %), Kraton G 1652 (4.25 weight %), Mineral oil (33 weight %), and Akrowax 5050 (33 weight %) in d-limonene as solvent.

Example 4

A film was prepared as above without mineral oil. The film forming composition included Kraton G 1651 (8.8 weight %), Kraton G 1650 (10.45 weight %), Kraton G 1652 (2.75 weight %), low density polyethylene (39 weight %) and Akrowax 5050 (39 weight %). This film was very strong, flexible but less elastic.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a dip formable composition, articles formed from such compositions, and methods of making articles using such compositions. Modifications may occur to those skilled in the art and to those who may make and use the invention. The disclosed embodiments are merely for illustrative purposes and not intended to limit the scope of the invention or the subject matter set forth in the claims.

What is claimed is:

1. A dip formable composition comprising (i) a styrenic block copolymer disposed in a cyclic terpene, a (ii) a polyolefin, and (iii) an oil, wherein the styrenic block copolymer is present in an amount of from about 5% to about 50% by weight, the polyolefin in an amount of from about 0.1% to about 25% by weight, and the oil in an amount of from about 25% to about 75% by weight, where the % by weight refers to the % by weight of a dry film formed from the dip formable composition.

2. The dip formable composition of claim 1, in which the styrenic block copolymer is chosen from a saturated styrenic block copolymer or a mixture of saturated styrenic block copolymers.

3. The dip formable composition of claim 1, wherein the styrenic block copolymer is saturated.

4. The dip formable composition of claim 1, wherein the block copolymer is a styrene-ethyl ene-butylene-styrene block copolymer.

5. The dip formable composition of claim 1, wherein the composition is in the form of a solution, an emulsion, or a plastisol.

6. A method for preparation of a film article comprising:
  (i) dipping a form in the shape of an article into a first dip formable composition comprising a styrenic block copolymer disposed in a cyclic terpene;
  (ii) withdrawing the form from the solution;
  (iii) evaporating the cyclic terpenes from the film on the form; and
  (iv) removing the formed article from the form, wherein prior to the step (i), the method comprises heating the dip formable composition above the ambient temperature but below the boiling point of the cyclic terpene to form a dip formable solution.

7. The method of claim 6, wherein evaporating the cyclic terpenes from the film on the form comprises evaporating substantially all the cyclic terpenes from the film.

8. The method of claim 6, wherein the method is employed to form a multilayered article and comprises repeating steps (i)-(iii) with a second dip formable composition for forming an elastomeric material.

9. The method of claim 8, wherein the second dip formable composition is a dip formable composition comprising a styrenic block copolymer disposed in a cyclic terpene and the second dip formable composition is different from the first dip formable composition.

10. An article formed from the dip formable composition of claim 1.

11. The article of claim 10, wherein the article is a multilayered article.

12. The article of claim 10, wherein the article is chosen from a glove, a condom, a catheter, a dental dam, a finger cot, a teat, a pacifier, a soother, a swim cap, a balloon, or a bladder for a ball.

* * * * *